United States Patent [19]
Klass et al.

[11] Patent Number: 6,079,875
[45] Date of Patent: Jun. 27, 2000

[54] APPARATUS FOR MEASURING THE TEMPERATURE OF AN OBJECT WITH A TEMPERATURE SENSOR AND METHOD OF MAKING THE TEMPERATURE SENSOR

[75] Inventors: Joachim Klass, Stadthagen; Michael Stürmer, Löhne; Peter Madry, Barsinghausen, all of Germany

[73] Assignee: Alcatel, Paris, France

[21] Appl. No.: 09/146,467

[22] Filed: Sep. 3, 1998

[30] Foreign Application Priority Data

Sep. 4, 1997 [DE] Germany .......................... 197 38 651

[51] Int. Cl.$^7$ .......................... G01K 11/12; G01K 1/14; G01N 21/41; G02B 6/04; G01J 5/08
[52] U.S. Cl. .......................... 374/130; 374/161; 374/157; 385/12
[58] Field of Search .................................. 374/161, 152, 374/147; 385/12

[56] References Cited

U.S. PATENT DOCUMENTS

| | | | |
|---|---|---|---|
| 4,654,520 | 3/1987 | Griffiths | 350/96.15 |
| 5,028,146 | 7/1991 | Wada | 374/131 |
| 5,095,514 | 3/1992 | Curtis | 385/12 |
| 5,306,088 | 4/1994 | Zoener | 374/131 |
| 5,864,641 | 1/1999 | Murphy et al. | 385/12 |

FOREIGN PATENT DOCUMENTS

| | | |
|---|---|---|
| 0 108 671 A1 | 10/1982 | European Pat. Off. . |
| 0 553 675 A1 | 1/1992 | European Pat. Off. . |
| 0 203 249 B1 | 4/1992 | European Pat. Off. . |
| 0 490 849 A1 | 6/1992 | European Pat. Off. . |
| 0 553 675 A1 | 8/1993 | European Pat. Off. . |
| 93 18 404 U1 | 1/1993 | Germany . |
| 43 37 402 A1 | 10/1993 | Germany . |
| 195 41 142 A1 | 4/1997 | Germany . |
| 57-111424 | 7/1982 | Japan . |
| 2 252 402 | 4/1995 | United Kingdom . |

OTHER PUBLICATIONS

Claus, R.O. et al: "Embedded Optical Fiber Sensors for Materials Evaluation", Journal of Nondestructive Evaluation, Bd. 8, Nr. 2, Jun. 1, 1989, pp. 135–145, XP000162097.

"Fiber Loop Thermometry", Electronics & Wireless World, Bd. 95, Nr. 1636, Feb. 1989, pp. 170–172, XP000045161.

Lee, C.E. et al: "Optical–Fiber Fabry–Perot Embedded Sensor", Optics Letters, Bd. 14, Nr. 21, Nov. 1, 1989, pp. 1225–1227, XP000080705.

Patent Abstracts of Japan, vol. 006, No. 203 (P–148), Oct. 14, 1982 & JP 57 111424 A (Fujitsu KK), Jul. 10, 1982.

Angenend, M.: Lichtwellenleiter in VPE—isolierten Energiekabeln zur Temperturmessung. In: Elektrizitatswirtschaft, Jg. 92 1993 H10 S.592–594, 596, 597.

JP Patent Abstracts of Japan, 4–174331 A., P–1443, Oct. 9, 1992, vol. 16, No. 489.

JP Patent Abstracts of Japan, 3–210440 A., P–1286, Dec. 10, 1991, vol. 15, No. 487.

JP Patent Abstracts of Japan, 3–13831 A., P–1186, Mar. 29, 1991, vol. 15, No. 131.

JP Patent Abstracts of Japan, 2–195218 A., P–1119, Oct. 19, 1990, Voo. 14, No. 482.

JP Patent Abstracts of Japan, 61–66134 A., P–486, Aug. 12, 1986, vol. 10, No. 232.

JP Patent Abstracts of Japan, 4–177134 A., P–1434, Oct. 12, 1992, vol. 16, No. 491.

JP Patent Abstracts of Japan, 07243919 A.

JP Patent Abstracts of Japan, 08145810 A.

*Primary Examiner*—G. Bradley Bennett
*Assistant Examiner*—Gail Verbitsky
*Attorney, Agent, or Firm*—Ware, Fressola, Van der Sluys & Adolphson LLP

[57] ABSTRACT

An apparatus (1) for measuring the temperature of an object (3) has a temperature sensor (5) with at least one optical fiber (7) and a temperature measurement system (10), wherein the optical fiber (7) of the temperature sensor (5) is supported by a support element (15, 17, 18). With this apparatus, the temperature even of smaller object (3) can be measured easily and accurately. A method for producing the sensor includes placing at least one optical fiber on an adhesive side of a first foil and then placing a second foil on the adhesive side of the first foil.

24 Claims, 4 Drawing Sheets

APPARATUS FOR MEASURING THE TEMPERATURE OF AN OBJECT WITH A TEMPERATURE SENSOR AND METHOD OF MAKING THE TEMPERATURE SENSOR

BACKGROUND OF THE INVENTION

1. Technical Field

The invention relates to an apparatus for measuring the temperature of an object with a temperature sensor which has at least one optical fiber and to a temperature measurement system. The invention also relates to a method for producing an apparatus which has at least one temperature sensor with an optical fiber and a temperature measurement system for measuring the temperature of an object, wherein the temperature sensor is placed against the object and connected to the temperature measurement system.

2. Description of the Prior Art

The large number of cables and wires placed underground for different services and the large number of buildings particularly in densely populated areas increasingly call for a determination of the temperatures along a cable run in the ground and a check of the thermal load of the at least one cable. The transmission capacity of an power cable can be optimally utilized if the actual temperature of the cable is known and the thermal limits are simultaneously observed.

EP 0 203 249 B1 describes a power cable which includes at least one optical fiber extending along the cable inside a protective sheath and operating as a temperature sensor. The temperature can be measured with the optical fiber over the entire length of the cable during operation without employing metals. Also, increases in the local temperature and malfunctions can be detected.

Optical fibers can also be used to measure and, if desired, control the temperature of other objects which are at an electric potential, such as the temperature of cables designed for intermediate and high voltages or the temperature of other devices. A fiber length of several meters is required to measure the temperature even of a small object or region with sufficient accuracy. It is not feasible to wind several meters of fiber tightly around the object, if the circumference of object changes with increasing or decreasing temperature.

SUMMARY OF THE INVENTION

It is therefore the object of the invention to provide a simple apparatus for determining the temperature of various objects which is easy to install, which can be applied universally and which provides highly accurate measurements even on small objects.

The object is solved with the invention in that the optical fiber of the temperature sensor is supported by a support element.

With the present invention, the temperature sensor can advantageously have a very long optical fiber for measuring the temperature even if the sensor itself is small. The optical fiber is preferably made of glass and can be considerably longer than the object to be monitored. When the temperature is measured with a long fiber, the temperature of even rather small areas or object, such as cables designed for intermediate or high voltages, can be measured and monitored exactly and continuously. Moreover, such a long optical fiber advantageously forms an average value of the temperature automatically. The apparatus of the invention can also be used to determine the temperature of objects whose circumference changes as a function of temperature. The apparatus can also be used to measure the temperature of objects which are arranged in close proximity from each other which would make it difficult to measure their respective temperatures separately. The temperature sensor which includes a support element and an optical fiber supported by the support element, can also be manufactured easily and inexpensively and can simply and reliably be placed against or wound around an object to be tested. For example, the temperature sensor can be secured on a cable designed for intermediate or high voltages by placing a sheath over the temperature sensor which is wound around the cables.

To securely arrange the optical fiber and make the temperature sensor easy to manufacture, the support element is advantageously made of two foils with the optical fiber placed between the two foils.

To fit the largest possible length of the optical fiber for measuring the temperature between the two foils of the temperature sensor for a predetermined size of the temperature sensor, the optical fiber is advantageously arranged between the two foils in form of a spiral, a meander or a loop. The measurement accuracy can then be very high even if the external dimensions of the temperature sensor are small.

The optical fiber is embedded between the two foils at least approximately air-tight and can therefore directly contact the object to measure its temperature without intervening air inclusions and thus provide excellent heat transfer between the object and the optical fiber.

Advantageously, the temperature sensor is placed around the object, whereby the temperature of the object can be measured easily and accurately.

To maintain the position and shape, such as the spiral, loop or meander, of the optical fiber during the manufacture of the temperature sensor and to ensure an essentially air-tight joining between the two foils, the side facing the other foil of at least one of the two foils is provided with an adhesive.

For the same reason, at least one of the foils is advantageously provided with a pressure-sensitive adhesive on the side facing the other foil.

The two foils are advantageously made of plastic, so that the walls of the temperature sensor can be made thin and the temperature sensor can be manufactured and installed easily and provide exact temperature measurements. Advantageously, at least the foil facing the object has a good thermal conductivity to provide good heat transfer between the object and the optical fiber measuring the temperature.

For good heat transfer between the object and the optical fiber of the temperature sensor, at least the outside surface, i.e., the side immediately contacting the object, of the foil facing the object is advantageously provided with a metallic layer.

The support element is advantageously a support tape when monitoring the temperature of an elongated object, such as a cable for intermediate or high voltages, a high frequency cable or a pipe. The optical fiber can then secured to or inside the support tape.

When the temperature sensor is a tape which is, for example, helically wound around the object, then the length of the optical fiber can be increased even further relative to the object to be monitored.

Advantageously, the optical fiber has the shape of a meander or a loop.

To reliably arrange the optical fiber and to provide a simple manufacture and installation of a temperature sensor in the form of a tape, the support element is advantageously formed by two superimposed foils.

To provide good heat transfer between the object and the optical fiber of the temperature sensor, the support tape advantageously has good thermal conductivity. On the outside surface facing the object, the support tape is advantageously provided with a metallic layer.

To manufacture the temperature sensor by a simple process, the optical fiber is advantageously placed on a side of a first foil which has an adhesive, whereafter a second foil is placed on the side of the first foil which has the adhesive and the optical fiber.

The invention will be fully understood when reference is made to the following detailed description taken in conjunction with the accompanying drawings.

DETAILED DESCRIPTION OF THE INVENTION

Figure 1:
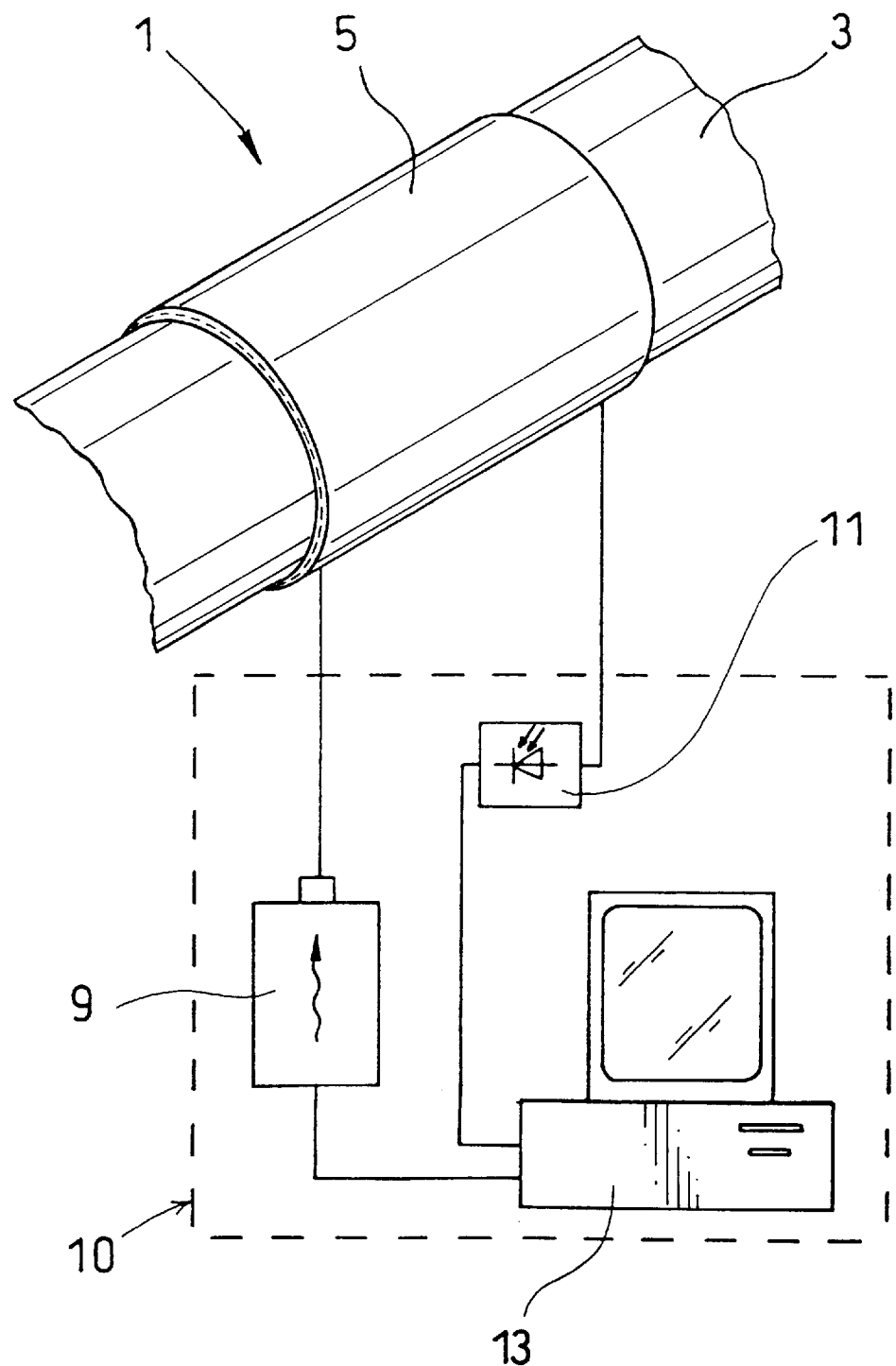
FIG. 1 is a perspective view of an apparatus measuring the temperature of an object with a temperature sensor which includes an optical fiber.

As shown in FIG. 1, the exemplary apparatus 1 for measuring the temperature of an object 3, e.g., a cable designed for intermediate or high voltages, has a temperature sensor 5 which is placed around the circumference of the object 3. The temperature sensor 5 has an optical fiber made of glass which is embedded essentially air-tight between two foils of the temperature sensor 5 and used to measure the temperature.

To monitor the temperature on the surface of the object 3 with this embodiment, a laser 9 of a temperature measurement system 10 injects an input signal into one and of the optical fiber of temperature sensor 5. The other end of the optical fiber of the temperature sensor 5 is connected to a light sensor 11 of the temperature measurement system 10 which operates as a signal receiver and can be, for example, a photo diode. The optical signal is then converted into a corresponding electrical signal. This electrical signal is transmitted to an processing unit 13 of the temperature measurement system 10.

The dependence of the physical properties of glass on temperature forms the basis for temperature measurements with optical fibers. When the temperature of the object 3 changes, the physical properties of the glass fiber in the temperature sensor 5 change accordingly which alters the optical transmission properties of the optical fiber. The processing unit 13 measures the change in the optical properties and determines the temperature change or the actual temperature, respectively, on the surface of the object 3. The temperature sensor 5 is also suited for other methods which measure a temperature with optical fibers and are based on changes of the physical properties of glass as a function of temperature.

Figure 2:
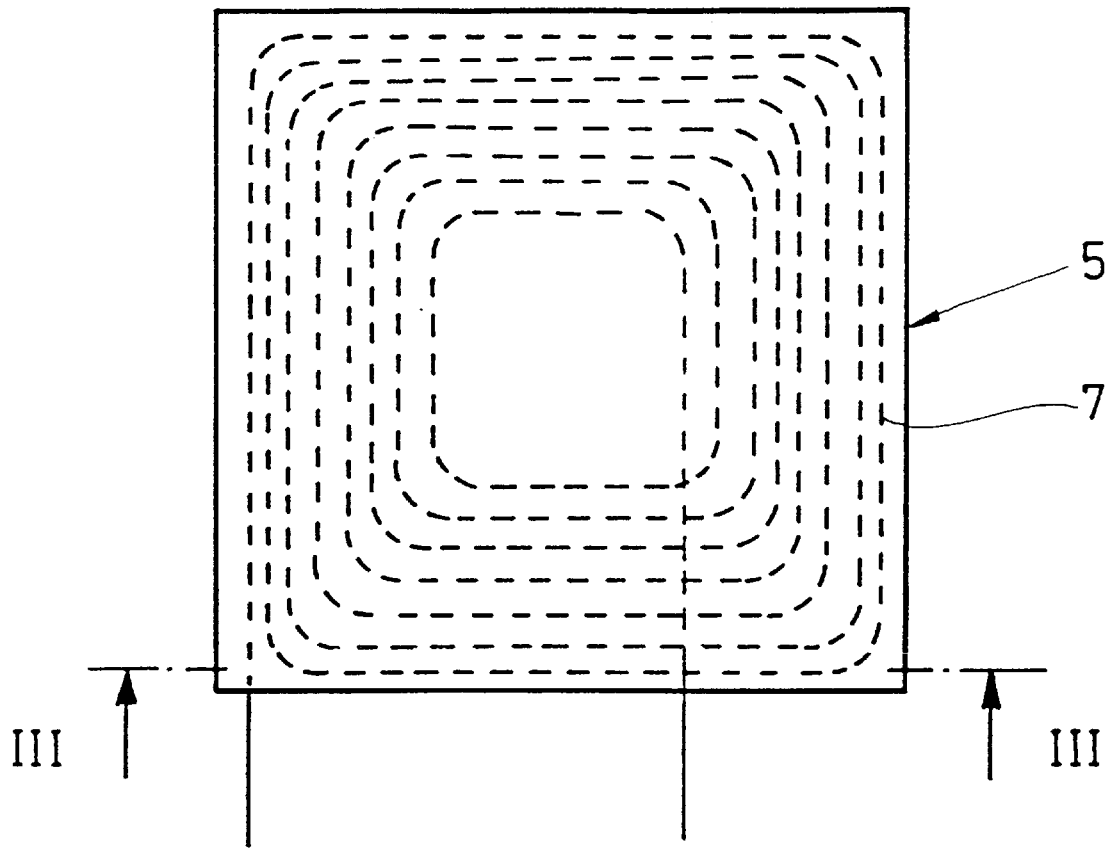
FIG. 2 is a top view of a first embodiment of a temperature sensor according to the invention.
Figure 3:
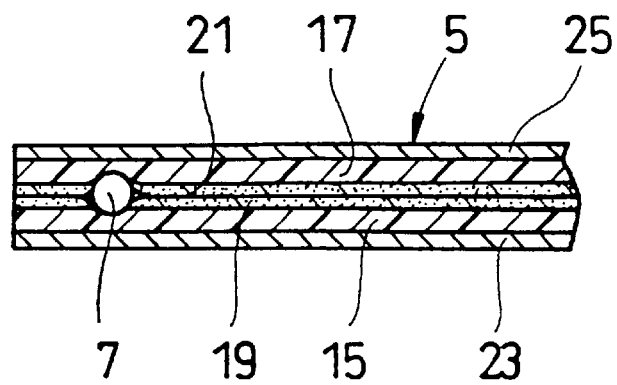
FIG. 3 is a partial, considerably enlarged cross-sectional view along the line III—III of FIG. 2.

FIG. 2 is a top view of a first embodiment of a temperature sensor 5 according to the invention wherein the optical fiber 7 is shown as a dotted line and can be, e.g., the form of a spiral or helix. FIG. 3 illustrates the construction of the temperature sensor 5 in a greatly enlarged cross-section along the line III—III of FIG. 2. The optical fiber 7 is embedded essentially air-tight between the two foils 15 and 17 which are made of plastic. Each of the foils 15 and 17 has, e.g., a pressure-sensitive adhesive on the side facing the respective other foil. Each of the foils 15 and 17 has a metallic layer 23 and 25, respectively, on the outside surface facing away from the respective other foil. However, only one of the outside surfaces of the temperature sensor 5 may have a metallic layer which is then used to contact the surface of the object to transfer heat efficiently between the object 3 and the optical fiber 7. For example, 20 meters of the helically wound optical fiber 7 can be placed inside a square temperature sensor 5 with a lateral dimension of 100 mm.

A temperature sensor 5 of this type can be produced by first winding an optical fiber 7 in the form of a spiral on a side of the first foil 15 which has an adhesive 19. Subsequently, the second foil 17 which, as shown in FIG. 3, can also have an adhesive 21 on the side facing the other foil 15, is placed on the side of the first foil 15 which has the adhesive 19 and the optical fiber 7. The second foil 17 is then pressed against the foil 15 to eliminate air bubbles which can form between the two foils 15 and 17 so that the optical fiber 7 is embedded between the two foils 15 and 17 in an at least approximately air-tight fashion. The optical fiber 7 which is, e.g., in the form of a spiral, is held in place easily and reliably on the first foil 15 by the adhesive 19 on the first foil 15, so that the temperature sensor 5 can be manufactured easily and inexpensively.

Figure 4:
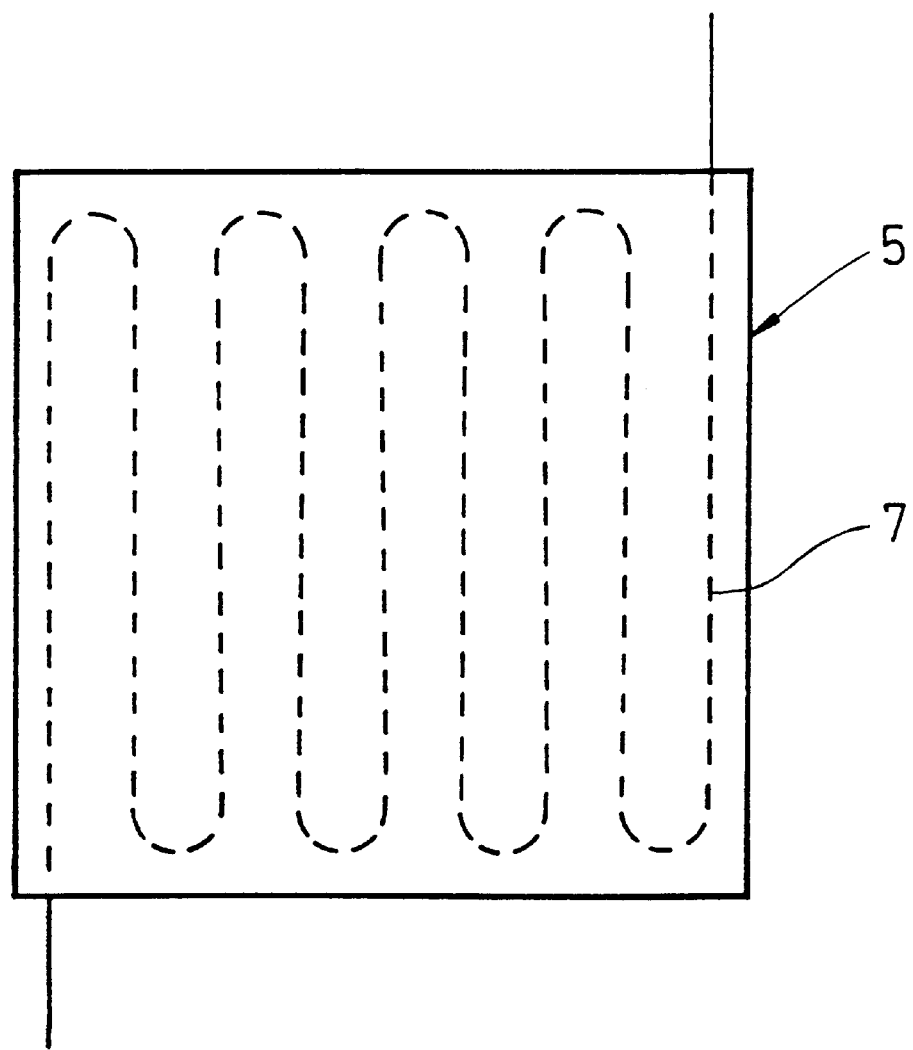
FIG. 4 is a top view of a second embodiment of a temperature sensor according to the invention.

FIG. 4 shows a top view of a second embodiment of a temperature sensor according to the invention. This second embodiment is similar to the first embodiment illustrated in FIGS. 2 and 3, except that the optical fiber 7 for measuring the temperature which is shown as a dotted line in FIG. 4, is embedded between the two foils of the temperature sensor 5 in the form of a meander, i.e., approximately undulatory. In all other aspects, the second embodiment of the temperature sensor 5 is essentially identical to the first embodiment. In all cases, the minimum allowable bending radius of the optical fiber 7 has to be observed.

Figure 5:
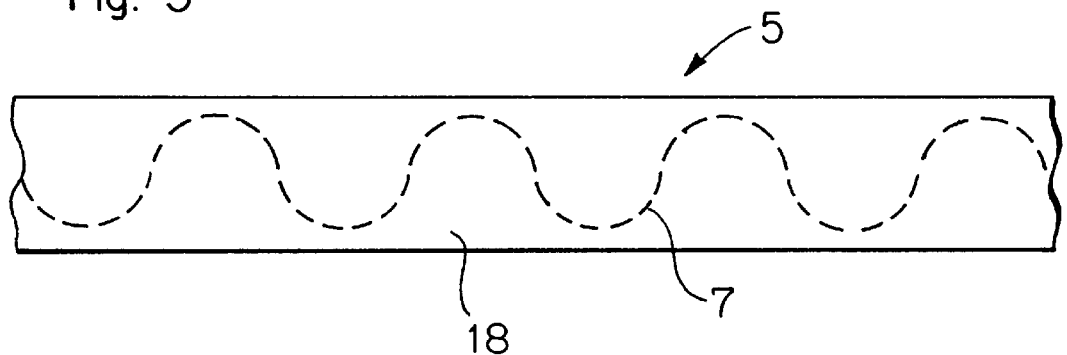
FIG. 5 is a top view of a third embodiment of a temperature sensor according to the invention.

The support element of the elongated temperature sensor 5 of FIG. 5 is a support tape 18 on which an optical fiber 7, shown as a dotted line, is arranged in the form of a meander, i.e., undulatory. The support tape 18 of the third embodiment is formed similar to the embodiments illustrated in FIGS. 2 to 4, i.e., by two superimposed glued or welded foils in the form of tapes.

Figure 6:
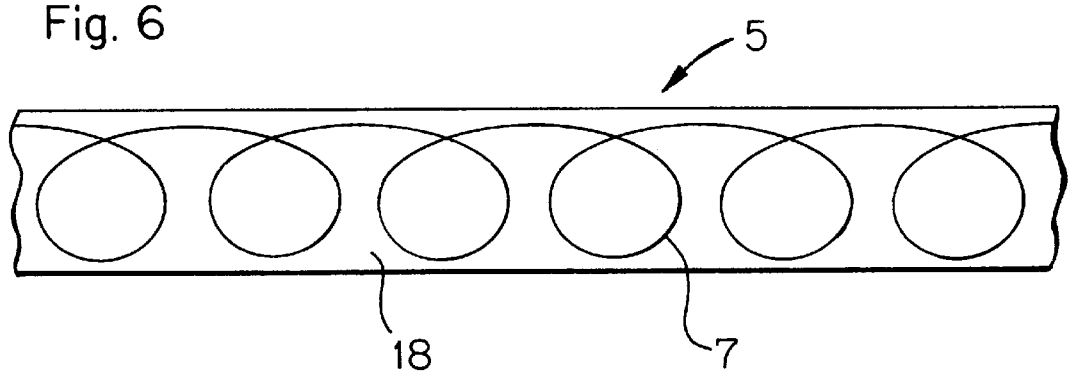
FIG. 6 is a top view of a fourth embodiment of a temperature sensor according to the invention.

FIG. 6 shows an elongated temperature sensor 5 according to a fourth embodiment wherein a looped optical fiber 7 is secured to a support tape 18, e.g., with an adhesive. The loops of the optical fiber 7 can be partially superimposed and overlap each other so that a greater length of the optical fiber 7 can be placed on the support tape 18 with a predetermined size.

Figure 7:
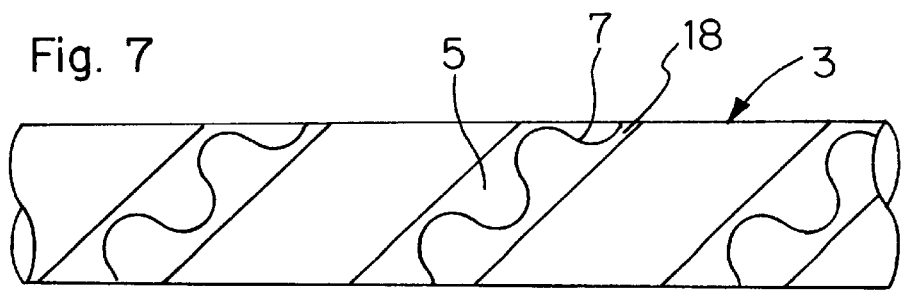
FIG. 7 is a side view of a temperature sensor in the form of a tape helically wound around an object to be monitored.

FIG. 7 shows an elongated temperature sensor 5 in the form of a tape wherein an optical fiber 7 is placed on the support tape 18 in the form of a meander. The temperature sensor 5 is then helically wound around an elongated object 3, e.g., a cable for intermediate or high voltages, which has to be monitored. On one hand, winding the temperature sensor 5 around the object 3 secures the temperature sensor.

On the other hand, the ratio of the length of the optical fiber 7 of the temperature sensor 5 for measuring the temperature to the length of the object 3 to be monitored is increased even further. A shape of the optical fiber 7 of the temperature sensor 5 in the form of a meander or a loop advantageously increases the fatigue strength for reversed bending relative to a optical fiber which is wound around the object with a long lay.

A temperature sensor 5 in the form of a tape cannot only be used to monitor the temperature of intermediate or high voltage cables, but also of high frequency cables, reelable cables and various pipes. If the temperature sensor 5 is incorporated in the cable itself, then a suitable material has to be selected for the support tape 18, which can be, for example, electrically conducting, expanding, diffusion tight or cushioning. A good heat transfer has to be maintained between the object 3 which is monitored, and the optical fiber 7 which monitors the temperature. Consequently, a support tape with a good thermal conductivity has to be selected and/or a metallic layer is applied to the outside of the support tape facing the object 3.

Alternatively, a temperature sensor 5 can have more than one optical fiber 7 monitoring the temperature, or several, usually spaced apart temperature sensors 5 can monitor the temperature of an object 3.

The embodiments described above admirably achieve the objects of the invention. However, it will be appreciated that departures can be made by those skilled in the art without departing from the spirit and scope of the invention which is limited only by the following claims.

What is claimed is:

1. Apparatus for measuring temperature of an electric power cable comprising:

(a) a temperature sensor with at least one optical fiber, the at least one optical fiber of the temperature sensor supported by a support element formed by two foils with the at least one optical fiber arranged between the two foils, the temperature sensor being wound around the electric power cable; and (b) a temperature measurement system operationally connected to the temperature sensor.

2. Apparatus according to claim 1, wherein the at least one optical fiber arranged between the two foils has a spiral shape.

3. Apparatus according to claim 1, wherein the at least one optical fiber arranged between the two foils is shaped like a meander.

4. Apparatus according to claim 1, wherein the at least one optical fiber arranged between the two foils has a loop shape.

5. Apparatus according to claim 1, wherein the at least one optical fiber is embedded between the two foils in a substantially air-tight manner.

6. Apparatus according to claim 1, wherein at least one of the foils is provided with an adhesive side facing the other foil.

7. Apparatus according to claim 1, wherein at least one of the foils has a pressure-sensitive adhesive side facing the other foil.

8. Apparatus according to claim 1, wherein the two foils are made of plastic.

9. Apparatus according to claim 1, wherein at least one of the foils has a good thermal conductivity.

10. Apparatus according to claim 1, wherein at least one of the foils is provided with a metallic layer on an outer side facing away from the other foil.

11. Apparatus according to claim 1, wherein the two foils are formed as a tape.

12. Apparatus according to claim 1, wherein the support element is formed by a support tape.

13. Apparatus according to claim 12, wherein the at least one optical fiber is secured to the support tape.

14. Apparatus according to claim 12, wherein the at least one optical fiber is arranged in the support tape.

15. Apparatus according to claim 14, wherein the support tape is formed by two superimposed foils.

16. Apparatus according to claim 12, wherein the at least one optical fiber extends along a meandering path.

17. Apparatus according to claim 12, wherein the at least one optical fiber extends along a looped path.

18. Apparatus according to claim 12, wherein the support tape has a good thermal conductivity.

19. Apparatus according to claim 12, wherein an outer side of the support tape adapted to face the object is provided with a metallic layer.

20. Method for producing a temperature sensor used in an apparatus for measuring the temperature of an electric power cable, the apparatus comprising the temperature sensor and a temperature measurement system, wherein the temperature sensor is wound around the electric power cable and connected to the temperature measurement system, the method comprising the steps of:

(a) providing a first foil which has an adhesive side;

(b) placing an optical fiber on the adhesive side of the first foil; and (c) applying a second foil on the adhesive side of the first foil which has the optical fiber thereon.

21. Method according to claim 20, wherein the optical fiber is placed on the adhesive side of the first foil so as to form a spiral.

22. Method according to claim 20, wherein the optical fiber is placed on the adhesive side of the first foil so as to form a meander.

23. Method according to claim 20, wherein the optical fiber is placed on the adhesive side of the first foil so as to form a loop.

24. Method according to claim 20, wherein the second foil is applied in a substantially air-tight manner on the adhesive side of the first foil which has the optical fiber.

* * * * *